(12) United States Patent
Eglin (10) Patent No.: US 9,150,307 B2
(45) Date of Patent: Oct. 6, 2015

(54) METHOD OF CONTROLLING THE WING FLAPS AND HORIZONTAL STABILIZER OF A HYBRID HELICOPTER

(71) Applicant: AIRBUS HELICOPTERS, Marignane (FR)

(72) Inventor: Paul Eglin, Roquefort la Bedoule (FR)

(73) Assignee: Airbus Helicopters, Marignane (FR)

(*) Notice: Subject to any disclaimer, the term of this patent is extended or adjusted under 35 U.S.C. 154(b) by 313 days.

(21) Appl. No.: 13/895,700

(22) Filed: May 16, 2013

(65) Prior Publication Data

US 2014/0084105 A1 Mar. 27, 2014

(30) Foreign Application Priority Data

May 21, 2012 (FR) ...................... 12 01431

(51) Int. Cl.
| | | |
|---|---|---|
| B64C 27/22 | (2006.01) | |
| B64C 27/57 | (2006.01) | |
| B64C 19/00 | (2006.01) | |
| B64C 27/26 | (2006.01) | |
| B64D 45/00 | (2006.01) | |
| B64C 13/16 | (2006.01) | |

(52) U.S. Cl.
CPC ................. *B64C 27/57* (2013.01); *B64C 13/16* (2013.01); *B64C 19/00* (2013.01); *B64C 27/26* (2013.01); *B64D 45/00* (2013.01); *Y02T 50/44* (2013.01)

(58) Field of Classification Search
USPC ........... 244/6, 17.13, 76 R, 12.3, 17.11, 75.1; 701/3
See application file for complete search history.

(56) References Cited

U.S. PATENT DOCUMENTS

| | | | |
|---|---|---|---|
| 8,052,094 B2 | 11/2011 | Roesch | |
| 8,113,460 B2 | 2/2012 | Roesch | |
| 2005/0151001 A1 | 7/2005 | Loper | |
| 2008/0237392 A1 | 10/2008 | Piasecki | |
| 2012/0153072 A1 | 6/2012 | Eglin | |
| 2013/0020429 A1* | 1/2013 | Kroo | ................. 244/6 |

FOREIGN PATENT DOCUMENTS

| | | |
|---|---|---|
| FR | 2916419 A1 | 11/2008 |
| FR | 2916420 A1 | 11/2008 |
| FR | 2959205 A1 | 10/2011 |
| WO | 2005005250 A2 | 1/2005 |

OTHER PUBLICATIONS

Search Report and Written Opinion; Application No. FR 1201431; dated Feb. 15, 2013.

* cited by examiner

*Primary Examiner* — J. Woodrow Eldred
(74) *Attorney, Agent, or Firm* — Brooks Kushman P.C.

(57) ABSTRACT

A method of controlling a high speed rotary wing aircraft (1) comprising: a fuselage (2); at least one main rotor (3); at least one variable pitch propulsive propeller (4); at least two half-wings (11, 11') positioned on either side of said fuselage (2); at least one horizontal stabilizer (20) provided with a movable surface (21, 21'); and at least one power plant driving said main rotor (3) and each propulsive propeller (4) in rotation. Said method serves to adjust the lift of said half-wings (11, 11') and the lift of the horizontal stabilizer (20) so that the collective pitch of said blades (31) of said main rotor (3) is equal to a setpoint collective pitch, so that the longitudinal cyclic pitch of said blades (31) of said main rotor (3) is equal to a setpoint longitudinal cyclic pitch, and so that the lateral cyclic pitch of said blades (31) of said main rotor (3) is equal to a setpoint lateral cyclic pitch during a stabilized stage of flight.

20 Claims, 2 Drawing Sheets

METHOD OF CONTROLLING THE WING FLAPS AND HORIZONTAL STABILIZER OF A HYBRID HELICOPTER

CROSS REFERENCE TO RELATED APPLICATIONS

This application claims priority to French patent application No. FR 12/01431 filed on May 21, 2012, the disclosure of which is incorporated in its entirety by reference herein.

BACKGROUND OF THE INVENTION (1) Field of the Invention

The present invention relates to the technical field of the flight mechanics of a rotary wing aircraft. It relates to a method of controlling such an aircraft during a stabilized stage of flight at high speed. It also relates to a control device for such an aircraft.

(2) Description of Related Art

The method and the device are intended more particularly for hybrid helicopters, i.e. rotary wing aircraft fitted with auxiliary propulsion.

A rotary wing aircraft conventionally comprises at least one main rotor, serving to provide the aircraft both with lift and with propulsion, a fuselage, and a power plant.

A hybrid helicopter also includes at least one propulsive propeller and a lift-providing surface, or more simply a "lift surface", generally made up both of two half-wings situated on either side of the fuselage and of a horizontal stabilizer positioned at one end of the aircraft.

By way of example, two variable-pitch propulsive propellers are positioned on either side of the fuselage, one on each of the half-wings.

In addition, each half-wing may be fitted with at least one movable flap enabling the lift of each half-wing to be modified. Likewise, the horizontal stabilizer includes at least one movable surface in order to modify the lift of the horizontal stabilizer. The movable surface may be constituted by an elevator surface or by the horizontal stabilizer as a whole.

The main function of the two half-wings is to contribute to providing the hybrid helicopter with lift while it is in flight and flying at a high forward speed, with the propulsive propeller(s) making it possible to reach such a speed. In contrast, it is possible to speak of flight at moderate speed for flights at forward speeds that are slower than that of a cruising flight.

When flying at high forward speed, the movable horizontal stabilizer or the elevator surface of the hybrid helicopter are equivalent to a trim compensator in an airplane. Pitching control of the hybrid helicopter is performed using the cyclic control of the main rotor, while the movable horizontal stabilizer (or its elevator surface) serves to adjust the pitching equilibrium point of the aircraft in application of various criteria such as the attitude of the aircraft, or indeed the bending moment of the mast of the main rotor. In such a configuration, the half-wings contribute to the total lift of the aircraft needed for keeping the aircraft in the air. Consequently, the main rotor provides part of the lift in a hybrid helicopter when flying with high-speed forward speed, and possibly also contributes to propelling it forwards.

It can thus be seen that piloting a hybrid helicopter during high-speed forward flight requires special controls in order to modify the lifts of the half-wings and of the horizontal stabilizer, and also the pitches of the propulsive propellers.

Consequently, during flight at a high forward speed the workload on the pilot is large and complex in order to be able to manage the specific controls of the hybrid helicopter in addition to the conventional controls of a rotary wing aircraft.

An object of the present invention is thus to provide a method of assisting the pilot in reducing his workload, by automatically adjusting the lifts of the half-wings and of the horizontal stabilizer specific to such a hybrid helicopter during a stabilized stage of flight.

The term "stabilized stage of flight" is used to mean flight at high forward speed, and thus applies to hybrid helicopters when flying conditions are constant, i.e. when the main flight parameters are constant. This applies in particular to the vertical speed and to the path of the aircraft. Constant vertical speed may be obtained in particular by maintaining the attitude and/or the angle of incidence of the aircraft constant. In the special situation where the vertical speed is zero, the stabilized stage of flight takes place at constant altitude, and can then be referred to as "cruising" flight. A constant path corresponds to a path without the aircraft changing heading. During such a stabilized stage of flight, the forward speed is preferably also constant. Nevertheless, it may vary, but generally slowly. In the method of the invention, dynamic variations take place slowly, so the method is compatible with forward speed varying in such a manner.

Document US 2008/0237392 describes a hybrid helicopter using a control system for controlling all of the controls of the aircraft. The aircraft incorporates databases of optimized and predefined flight parameters for different flight conditions and different types of flight.

The pilot selects the type of flight that is to be performed, e.g. minimizing fuel consumption, minimizing vibration, or indeed maximizing forward speed. The control system determines flight conditions by using various sensors incorporated in the hybrid helicopter and then selects from the database various predefined settings for the various controls of the aircraft corresponding to such flight conditions.

The control system then communicates these predetermined settings to the autopilot which acts without intervention from the pilot to apply them to the various control members of the hybrid helicopter.

Document FR 2 959 205 describes a method of controlling and regulating the deflection angle of a horizontal stabilizer of a hybrid helicopter at a stabilized high speed of advance. The purpose of that adjustment of the deflection angle is to optimize the power consumed by the aircraft.

That method comprises three regulation loops. The first loop controls the attitude of the aircraft by means of the longitudinal cyclic pitch, and the second loop controls the forward speed of the aircraft by means of the pitch of the propulsive propellers. Those two loops ensure that the aircraft is stabilized in longitudinal attitude and in forward speed. Finally, the third loop optimizes the power of the aircraft by means of the deflection angle of the horizontal stabilizer while maintaining the longitudinal attitude and the forward speed constant.

Any variation in the deflection angle of the horizontal stabilizer modifies its lift. Consequently, since the longitudinal attitude of the aircraft is kept constant by the first regulation loop, such variation in the lift of the horizontal stabilizer serves to subject the fuselage to a pitching moment in a nose-down or a nose-up direction. It is then appropriate to act on the orientation of the main rotor so that it tends towards a "nose-up" attitude or a "nose-down" attitude as required in order to counter the effect of the pitching moment of the stabilizer.

When the main rotor tends towards a nose-down attitude, it provides propulsion, i.e. it contributes to making the aircraft advance, providing it is being driven in rotation by the power plant of the aircraft. In contrast, when the main rotor is tending towards a nose-up attitude, it is in autogyro mode, i.e. it is not driven in rotation by the power plant, but rather by the flow of air created by the aircraft moving forwards. Under such circumstances, the main rotor serves to generate only lift.

Consequently, modifying the angle of deflection of the horizontal stabilizer has an effect on the operation of the main rotor and in particular on the power it consumes.

Furthermore, document FR 2 916 420 describes a hybrid helicopter having at least one elevator surface on a horizontal stabilizer with a deflection angle that can be controlled as a function of the bending moment of the mast of the main rotor. In addition, the cyclic pitch control for the blades of the main rotor enables the longitudinal attitude of the hybrid helicopter to be controlled, and the lift of the wings of that hybrid helicopter may thus be set to some particular percentage of the total lift in cruising flight.

In addition, document WO 2005/005250 describes a hybrid helicopter in which the wings provide about 70% of the total lift during cruising flight.

Also known is document FR 2 916 419, which describes a hybrid helicopter in which the speed of rotation of the main rotor can be reduced in cruising flight. Controlling the longitudinal cyclic pitch of the blades of the main rotor then enables the drag of the fuselage of the hybrid helicopter to be reduced. In addition, that helicopter has at least one elevator surface on a horizontal stabilizer with a deflection angle that can be controlled in order to cancel the bending moment of the mast of the main rotor.

Also known is an autopilot device for a hybrid helicopter that enables the aerodynamic angle of incidence of the aircraft to be kept constant and equal to a reference angle of incidence while performing stabilized cruising flight. In order to maintain this angle of incidence constant, the autopilot acts on the collective pitch of the blades of the main rotor.

Likewise, that device makes it possible to maintain the longitudinal attitude of the aircraft about its pitching axis constant and equal to a reference attitude while performing stabilized cruising flight. Under such circumstances, the autopilot acts on the longitudinal cyclic pitch of the blades of the main rotor.

In addition, the device provides a display that may show the reference angle of incidence and the reference attitude. The pilot can then see on the display both the actual attitude and angle of incidence of the aircraft and, where appropriate the corresponding reference values.

BRIEF SUMMARY OF THE INVENTION

An object of the present invention is to provide a method of controlling a high-speed rotary wing aircraft that makes it possible simultaneously to control the lift of the half-wings and of the horizontal stabilizer during a stabilized stage of flight. According to the invention, such an aircraft comprises a fuselage, at least one main rotor having a plurality of blades, at least one variable-pitch propulsive propeller, at least one lift surface, and at least one power plant driving the main rotor and each propulsive propeller in rotation. The lift surface may comprise two half-wings positioned on either side of the fuselage together with at least one horizontal stabilizer positioned at one end of the aircraft and provided with at least one movable surface.

The method makes it possible to determine a setpoint collective pitch and a setpoint longitudinal cyclic pitch, and then to adjust the lift of the two half-wings so that the collective pitch for the blades of the main rotor is equal to that setpoint collective pitch during a stabilized stage of flight. The lift of the two half-wings, which is equal to the sum of the lifts from each of the half-wings, is adjusted by acting on aerodynamic control means of the aircraft.

A stabilized stage of flight corresponds to flight relative to a path and a horizontal speed of the aircraft that are constant, with its vertical speed being constant, or indeed zero, in the particular case of a level flight. Such a flight can be obtained in particular by the action of an autopilot present in the aircraft adjusting in particular the longitudinal cyclic pitch and the collective cyclic pitch controls for the blades of the main rotor of the aircraft. The pitch of each propulsive propeller may also be adjusted by the autopilot.

Thus, a stabilized stage of flight may be obtained by means of a first regulation loop of the controls of the aircraft, with the method of the invention then constituting a second regulation loop for some of those controls.

However, complete stabilization of the aircraft during a stabilized stage of flight is not then ensured in optimum manner.

Firstly, in flight, the total lift of the aircraft varies, in particular as a function of the mass of the aircraft.

Furthermore, the density of the air surrounding the aircraft varies as a function of temperature and as a function of altitude, thereby affecting the lift adjustment of the aircraft.

Fuel consumption lightens the aircraft while it is in flight. Furthermore, during a mission, the aircraft may need to load and unload freight or passengers, and that has an impact on its mass.

The total lift of an aircraft counters its weight in order to maintain the aircraft in the air, where the weight of an aircraft is obtained by multiplying its mass by the acceleration due to terrestrial gravity. Below, the term "total lift" is used to mean the lift needed to balance the weight of the aircraft.

When the total lift of the aircraft exactly balances its weight, the aircraft flies with vertical acceleration that is zero, i.e. at a vertical speed that is constant. When its total lift is greater than its weight, the aircraft moves with positive vertical acceleration, i.e. its rate of climb increases. In contrast, when its total lift is less than its weight, the aircraft moves with negative vertical acceleration, i.e. its descent speed increases.

As a result, in order to maintain a stabilized stage of flight, the total lift of the aircraft must be adjusted continuously so as to adapt to variations in the weight of the aircraft and in the density of the air.

This total lift of the aircraft is constituted mainly by the lift from the main rotor so long as the speed of flight is moderate. In contrast, when flying at a high forward speed, lift is constituted essentially by the sum of the lift from the main rotor plus the lift from the half-wings. The fuselage of the aircraft and its horizontal stabilizer may also give a contribution to this total lift of the aircraft. Nevertheless, that is not taken into account herein since it is negligible for most aircraft.

While flying at high forward speed, the presence of the half-wings serves to reduce the contribution of the main rotor to the total lift of the aircraft. In addition, using at least one propulsive propeller makes it possible also to reduce the contribution of the main rotor to the propulsion of the aircraft. Consequently, the lift and the propulsion from the main rotor can both be reduced, and as a result it is also possible to reduce the aerodynamic drag of the main rotor.

The method of the invention is remarkable in that it makes it possible to adjust the lift of the half-wings of the aircraft so that the aircraft converges towards an optimized operating point for its main rotor during a stabilized stage of flight, while conserving a constant vertical behavior target, such as a constant vertical speed or angle of incidence, making it possible to remain in the stabilized stage of flight.

The main rotor of an aircraft possesses at least one optimum operating point that corresponds to a pair of values for the collective pitch and for the longitudinal cyclic pitch of the blades of the main rotor. This optimum operating point of the main rotor is generally identified during flight testing while the aircraft is under development. Amongst other things, it depends on the main rotor and on the half-wings of the aircraft.

These two values for the collective pitch and for the longitudinal cyclic pitch that correspond to the optimum operating point for the main rotor then constitute a setpoint collective pitch and a setpoint longitudinal cyclic pitch. These values may be functions in particular of the forward speed of the aircraft and of the density of the air.

This optimum operating point of the main rotor may correspond to a lift-to-drag (L/D) ratio or finesse of the main rotor, e.g. making it possible to minimize fuel consumption of the aircraft.

Thus, if the weight of the aircraft decreases as a result of it consuming fuel, the rotor remains set at the setpoint collective pitch while the lift of the half-wings is decreased in order to conserve the vertical behavior target that corresponds to the stabilized stage of flight.

The setpoint values for the collective and cyclic pitches depend in particular on the half-wings and on the main rotor for which the L/D ratio degrades with increasing load on the rotor.

For example, tests have revealed that the optimum operating point for the main rotor of an aircraft in a stabilized stage of flight corresponds to the power absorbed by the main rotor lying in the range 20% to 40% of the power that the main rotor absorbs during hovering flight.

In another example, for an aircraft weighing 7 metric tonnes (t), this optimum operating point for the main rotor may correspond to the main rotor delivering lift suitable for supporting a weight of 3.5 t.

The method of the invention makes it possible to bring the main rotor towards this optimum equilibrium operating point by adjusting the lift of the two half-wings. The total lift value of an aircraft corresponds to the sum of the lift from the main rotor plus the lift from the half-wings, and correspond to the target vertical behavior of the aircraft. Consequently, the lift of the main rotor changes when the lift of the two half-wings is adjusted in order to reach the total lift value. In addition, the lift of the main rotor is changed by modifying the collective pitch of the blades of the main rotor.

Thus, the method of the invention makes it possible to adjust the lift of the two half-wings until the collective pitch of the blades of the main rotor is equal to the setpoint collective pitch corresponding to the optimum operating point for the main rotor.

It should be recalled that the total lift of an aircraft counters the weight of the aircraft so as to keep the aircraft in the air, this weight corresponding to the mass of the aircraft multiplied by the acceleration due to the earth's gravity. Furthermore, this weight diminishes in flight in particular because of the power plant consuming fuel, so the total lift of the aircraft needs to diminish likewise.

Consequently, in order to conserve the operating point of the main rotor and the associated collective pitch value, the lift provided by the half-wings is adjusted by the method during the stabilized stage of flight in order to compensate for the variations in the weight of the aircraft.

Thus, the method makes it possible to reduce the workload on the pilot by automatically managing the lift of the half-wings in order to optimize the equilibrium of the aircraft during a stabilized stage of flight.

If the stage of flight is controlled manually by the pilot, the method of the invention has a slow rate of dynamic variation so as to avoid disturbing the piloting of the aircraft.

Likewise, when the stabilized stage of flight is performed by a first regulation loop of the controls of the aircraft, a second regulation loop constituting the method of the invention varies more slowly than the first loop so as to avoid disturbing operation of the first loop.

The method of the invention also makes it possible to adjust the lift of the horizontal stabilizer by acting on control means for moving the movable surface of the horizontal stabilizer in such a manner as to cause the longitudinal cyclic pitch of the blades of the main rotor to be equal to the setpoint longitudinal cyclic pitch.

As explained above, it is known that a variation in the lift of the horizontal stabilizer serves to cause the main rotor to take up a nose-down or a nose-up attitude during a stabilized stage of flight, with the attitude (or angle of incidence) of the aircraft remaining constant. The longitudinal cyclic pitch of the blades of the main rotor is then modified to counter the horizontal stabilizer in this respect, while the characteristics of the stage of flight, such as the forward speed of the aircraft or its attitude, for example, remain constant.

Consequently, the method serves to adjust the lift of the horizontal stabilizer until the longitudinal cyclic pitch of the blades of the main rotor corresponds to the setpoint longitudinal cyclic pitch. The lift of the horizontal stabilizer is adjusted by acting on the means for controlling each of the movable surfaces of the horizontal stabilizer. The method thus makes it possible in particular to compensate for variations in the position of the center of gravity of the aircraft.

As a result, the method makes it possible to reduce the workload on the pilot by automatically managing the lift of the horizontal stabilizer so as to optimize the equilibrium of the aircraft in a stabilized stage of flight.

Each movable surface of the stabilizer may be constituted by a movable elevator of the horizontal stabilizer. The horizontal stabilizer preferably has two elevators.

Adjusting the lift of the half-wings and the lift of the horizontal stabilizer is thus performed at low frequency so that the overall equilibrium of the aircraft converges on optimized operation of its main rotor during a stabilized stage of flight, while conserving a constant target vertical behavior such as a constant vertical speed or angle of incidence, and a constant target longitudinal attitude, corresponding to this stabilized stage of flight.

In addition, the method of the invention is used only during stabilized stages of flight. The forward speed of the aircraft must be faster than 50 knots (kts). Furthermore, the method needs to be deactivated during changes in the behavior of the aircraft, in particular when turning. For example, the method may be active only while the roll angle of the aircraft is less than 10°. Finally, in order to avoid opposing maneuvering by the pilot of the aircraft, the method is deactivated whenever pilot action on the controls of the aircraft is detected.

This method then makes it possible to adjust the lift of the two half-wings by acting on aerodynamic control means of the aircraft.

By way of example, this lift adjustment may be obtained by changing the aerodynamic angle of incidence, or more simply the "angle of incidence" of the half-wings of the aircraft. Such a change of angle of incidence may be obtained, for half-wings that are completely stationary, by changing the attitude of the aircraft. With the path followed by the aircraft remaining unchanged, a modification to the attitude of the aircraft and thus to its angle of incidence modifies the angle of incidence of the two half-wings. Under such circumstances, the aerodynamic control means of the aircraft thus enable the attitude of the aircraft to be modified.

It is also possible for the half-wings of the aircraft to be movable as a whole, e.g. in pivoting. The aerodynamic control means of the aircraft then enable the half-wings to be pivoted without changing the attitude of the aircraft, while nevertheless modifying the angle of incidence of said half-wings.

The aerodynamic control means of the aircraft preferably comprise, on each half-wing, at least one movable flap at the rear of a stationary lift surface and associated with at least one control system for operating each flap. Such operation corresponds to moving the flap, e.g. modifying the surface area of each flap and thus enabling the lift of each of the half-wings to be modified, while the angle of incidence of the half-wings remains constant. It is also possible to modify lift by pivoting each flap, with or without movement in translation.

Furthermore, the flaps of each of the half-wings may be operated in different manners as to obtain differences in lift between the two half-wings. This difference in lift between the two half-wings may serve for example to compensate for the effects of the main rotor, in particular in terms of roll movement.

The streams of air generated by the rotation of the main rotor affect the two half-wings placed on either side of the fuselage of the aircraft in different ways. These streams are turbulent and they travel from the front towards the rear over one half-wing and from the rear towards the front over the other half-wing. They thus create asymmetry in the angles of incidence between the two half-wings. A lift difference thus appears between the two half-wings and tends to cause the aircraft to roll.

In order to compensate for this difference in lift and thereby avoid causing the aircraft to roll, the pilot acts continuously on the lateral cyclic pitch of the blades of the main rotor. Advantageously, the method of the invention makes it possible to determine the lift difference between the half-wings. The method then makes it possible to operate each of the flaps, via their control systems, so as to adjust the lifts of the two half-wings and obtain this difference.

The pilot thus no longer needs to take charge of this compensation for the asymmetry in angle of incidence between the two half-wings that is generated by the main rotor.

Likewise, the method can adjust the lift of each half-wing, by operating each flap in independent manner via the flap control means so that the lateral cyclic pitch of the blades of the main rotor is equal to a setpoint lateral cyclic pitch. Under such circumstances, the difference in lift between the two half-wings as obtained in this way, associated with the roll moment of the rotor, serves to comply with a target lateral attitude of the aircraft. The flaps of the half-wings are operated at low frequency so that the aircraft converges on this target of lateral pitch. The setpoint lateral cyclic pitch may be a function of the forward speed of the aircraft and of the density of the air.

In another variant of this method, the bending moment of the mast of the main rotor is measured directly by a dedicated sensor. This bending moment serves to determine both a longitudinal bending moment and a lateral bending moment of the mast of the main rotor.

The lift of the horizontal stabilizer, that enables the main rotor to tend towards a nose-down or a nose-up configuration, acts directly on the value of this longitudinal bending moment. The method makes it possible to adjust the lift of the horizontal stabilizer until the longitudinal bending moment is equal to a setpoint longitudinal bending moment. Under such circumstances, the horizontal stabilizer thus enables a stabilized stage of flight to be performed with a bending moment of the mast of the main rotor corresponding to said setpoint longitudinal bending moment, e.g. for the purpose of reducing longitudinal stresses on the mast of the main rotor. Once more, the longitudinal cyclic pitch and the collective pitch are adjusted in order to keep conditions of flight unchanged.

Likewise, the lateral bending moment of the mast of the main rotor may be adjusted by controlling the flaps of the two half-wings in different manners so as to obtain a difference in lift between the two half-wings. The different lifts of each half-wing make it possible to generate a roll moment capable of opposing the lateral bending moment. The method adjusts the lift of each half-wing until a lateral bending moment of the mast of the main rotor is equal to a setpoint lateral bending moment, e.g. for the purpose of reducing lateral stresses in the mast of the main rotor.

The lift of the two half-wings is adjusted by acting on the control system for moving each flap. The setpoint longitudinal and lateral bending moments are a function of the conditions of flight.

In an implementation of the invention, information is displayed on display means of the aircraft relating to the actual values of the collective and cyclic pitches of the blades of the main rotor and also to the setpoint collective pitch and to the setpoint longitudinal and lateral cyclic pitches, together with information about the flaps of the two half-wings and information about the horizontal stabilizer.

In order to assist the pilot in optimizing the operation of the aircraft, the display means provides information enabling the pilot to adjust in optimum manner the collective and cyclic pitches of the blades of the main rotor and also the positions of the flaps of the half-wings and of the horizontal stabilizer.

For this purpose, a first graph displays a first point corresponding to the current pair of values for the collective pitch and the longitudinal cyclic pitch of the blades of the main rotor. The longitudinal cyclic pitch is plotted along the abscissa axis and the collective pitch is plotted up the ordinate axis of this first graph. The first graph also shows a second point corresponding to the pair of values constituted by the setpoint collective pitch and the setpoint longitudinal cyclic pitch.

In addition, a second graph having only one axis representing lateral cyclic pitch is used for displaying a third point corresponding to the current value of the lateral cyclic pitch of the blades of the main rotor and a fourth point corresponding to the setpoint lateral cyclic pitch.

Thereafter, in order to inform the pilot about the lift of the half-wings, a mean position is displayed for the flaps of the two half-wings, together with the position difference between those flaps. The mean position of the flaps corresponds to the identical position on each half-wing that would give the lift of the half-wings. The position difference between the flaps corresponds to the lift difference between the two half-wings that is being used for compensating the asymmetry in the angle of incidence between the two half-wings as generated by the main rotor.

Also displayed is a position of the movable surface (elevator) of the horizontal stabilizer corresponding to the lift of the stabilizer.

Finally, the display means display deflection setpoints, e.g. in the form of arrows, for informing the pilot. These deflection setpoints thus inform the pilot when performing manual piloting about the direction in which the flap of each half-wing and the movable surface of the horizontal stabilizer should be moved in order to cause the main rotor to converge towards its optimum operating point.

The invention also provides a rotary wing aircraft having a high forward speed in a stabilized stage of flight and suitable for implementing the above-described control method.

Such an aircraft has a fuselage, at least one main rotor with a plurality of blades, at least one variable-pitch propulsive propeller, at least one lift-providing surface, and at least one power plant driving the main rotor and each propulsive propeller in rotation.

This lift-providing surface comprises at least two half-wings positioned on either side of the fuselage together with at least one aerodynamic control means for modifying the lift of the half-wings. In addition, this lift-providing surface includes at least one horizontal stabilizer positioned at one end of the aircraft and including at least one movable surface together with control means for operating the movable surface.

The aerodynamic control means of the aircraft serves to adjust the lift of the two half-wings so that the collective pitch of the blades of the main rotor is equal to a setpoint collective pitch while in a stabilized stage of flight. This setpoint collective pitch corresponds to an optimum operating point for the main rotor.

In an implementation of the invention, the control means for moving the movable surface of the stabilizer enables this movable surface to be moved so as to adjust the lift of the horizontal stabilizer in order to cause the longitudinal cyclic pitch of the blades of the main rotor to be equal to a setpoint longitudinal cyclic pitch during a stabilized stage of flight. This setpoint longitudinal cyclic pitch corresponds to the same optimum operating point for the main rotor.

In an embodiment of the invention, the aerodynamic control means of the aircraft comprises at least one movable flap on each half-wing and at least one control system for operating each flap. Each control system serves to operate the corresponding flap so as to adjust the lift of the corresponding half-wing.

In an embodiment of the invention, the aircraft has display means displaying information enabling the pilot to optimize the operation of the aircraft.

The display means comprises two graphs providing information about the collective and cyclic pitches of the blades of the main rotor. On a first graph, the display means displays a first point corresponding to the current pair of values for the collective pitch and the longitudinal cyclic pitch of the blades of the main rotor together with a second point corresponding to the pair of values constituted by the setpoint collective pitch and the setpoint longitudinal cyclic pitch. Longitudinal cyclic pitch is plotted along the abscissa axis and collective pitch is plotted up the ordinate axis of this first graph.

A second graph having only one axis representing lateral cyclic pitch is used to display a third point corresponding to the current value of the longitudinal cyclic pitch of the blades of the main rotor and a fourth point corresponding to the setpoint lateral cyclic pitch.

Furthermore, in order to inform the pilot about the level of lift from the half-wings, the display means displays a mean position for the flaps of the two half-wings, together with a position difference between those flaps, thus corresponding to the lift difference between the two half-wings, thereby making it possible to compensate for the asymmetry in the angle of incidence between the two half-wings as generated by the main rotor.

Thereafter, the display means displays a position for the movable surface of the horizontal stabilizer corresponding to the lift of the stabilizer.

The display means likewise displays a mode of operation that has been activated concerning the flaps and the horizontal stabilizer. The control system that operates the flaps of each of the half-wings may be controlled by an autopilot that is present on board the aircraft, or else by the pilot. The control system may possibly fail and consequently be inoperable. The display means then serve to inform the pilot about which mode has been activated or that the control system is inoperable. The same applies for the means for controlling the horizontal stabilizer.

Finally, the display means displays deflection setpoints, e.g. in the form of arrows in order to inform the pilot. These deflection setpoints thus inform the pilot of the direction in which to move the flaps of each half-wing and the movable surface of the horizontal stabilizer in order to cause the main rotor to converge towards its optimum operating point.

BRIEF DESCRIPTION OF THE SEVERAL VIEWS OF THE DRAWINGS

The invention and its advantages appear in greater detail from the context of the following description of implementations given by way of illustration and with reference to the accompanying Figures, in which.

Elements that are shown in more than one of the figures are given the same references in each of them.

DETAILED DESCRIPTION OF THE INVENTION

Figure 1:
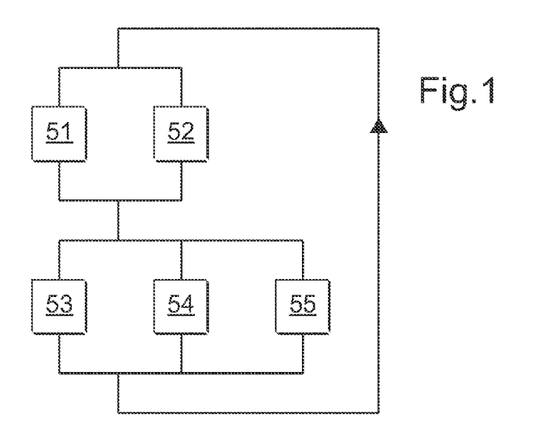
FIG. 1 shows a block diagram of the method of the invention.
Figure 2:
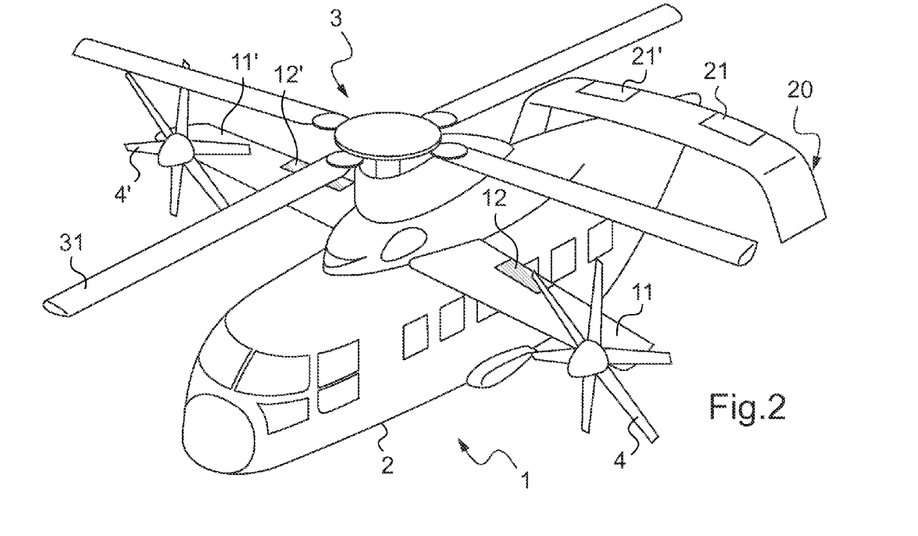
FIGS. 2 to 4 show an aircraft suitable for implementing the method of the invention.
Figure 3:
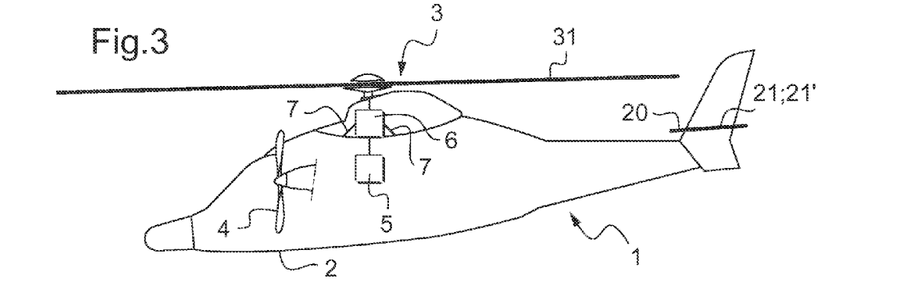
Figure 4:
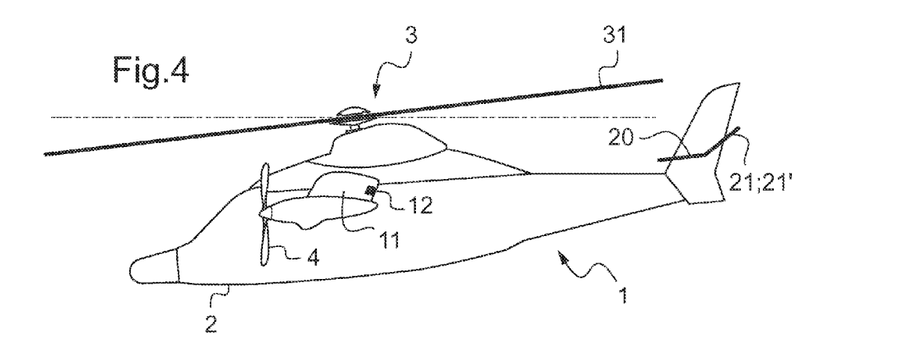

FIG. 1 shows a method of controlling a high-speed rotary wing aircraft, which methods are made up of several steps. FIGS. 2 to 4 show a high-speed rotary wing aircraft suitable for performing the control method of the invention.

The method serves to adjust the lift of the half-wings 11, 11' and of the horizontal stabilizer 20 during a stabilized stage of flight of the aircraft 1. During such a stabilized stage of flight, the main flight parameters of the aircraft 1 are constant, and in particular its path and its angle of incidence and also its forward speed. Furthermore, the method is activated on the aircraft only when the roll angle of the aircraft 1 is less than 10° and the forward speed of the aircraft 1 is greater than 50 kts, with no action being taken by a pilot on the controls of the aircraft 1.

Such an aircraft, as shown in FIGS. 2 and 3, has a fuselage 2, a main rotor 3 with a plurality of blades 31, two variable-pitch propulsive propellers 4 and 4', two half-wings 11 and 11' positioned on either side of the fuselage 2, a horizontal stabilizer 20 positioned at the rear end of the aircraft 1, and a power plant 5 that drives the main rotor 3 and the propulsive propellers 4, 4' in rotation. The power plant 5 is in particular connected to the main rotor 3 via a main power gearbox 6 that is secured to the fuselage 2 of the aircraft by a plurality of support bars 7.

The half-wings 11 and 11' include respective aerodynamic control means for adjusting the lift of each half-wing 11, 11'. These aerodynamic control means comprise respective flaps 12, 12' on each of the half-wings 11, 11' together with systems for operating the flaps 12, 12'. The horizontal stabilizer 20 has two movable surfaces 21, 21' that can be operated by control means for controlling the movable surfaces 21, 21'. Operating each of the flaps 12, 12' and operating the movable surfaces 21, 21' gives rise to an adjustment in the lift respectively of each half-wing 11, 11' and of the horizontal stabilizer 20.

The control method shown in FIG. 1 comprises four steps.

Step 51 consists in determining a setpoint collective pitch and a setpoint longitudinal cyclic pitch corresponding to an optimum operating point for the main rotor 3. This optimum operating point is generally identified during flight testing while the aircraft 1 is under development. Amongst other things, it depends on the main rotor 3 and on the half-wings 11, 11' of the aircraft 1. This optimum operating point of the main rotor 3 may correspond to an L/D ratio of the main rotor 3 that makes it possible for example to minimize the fuel consumption of the aircraft 1.

Simultaneously with step 51, a step 52 consists in determining a lift difference between the half-wings 11 and 11' in order to compensate for the effects of the main rotor 3 on each of the half-wings 11, 11'. The air streams generated by the rotation of the main rotor 3 affect the two half-wings 11 and 11' located on either side of the fuselage 2 of the aircraft 1 in different ways, thereby creating an asymmetry of angle of incidence between the two half-wings 11 and 11'. A lift difference appears between the half-wings 11, 11' and tends to cause the aircraft 1 to roll.

Step 52 consists in determining the lift difference between the half-wings 11, 11' in order to compensate this lift difference and avoid tending to make the aircraft 1 roll.

During a step 53, the lift of the half-wings 11, 11' is adjusted so that the collective pitch of the blades 31 of the main rotor 3 is equal to the setpoint collective pitch determined in step 51. The lift of the two half-wings 11, 11', i.e. the quantity equal to the sum of the lifts of each of the half-wings 11, 11', is adjusted by acting on aerodynamic control means of the aircraft 1.

Simultaneously with step 53, a step 54 consists in adjusting the lift of the horizontal stabilizer 20 so that the longitudinal cyclic pitch of the blades 31 of the main rotor 3 is equal to a setpoint longitudinal pitch determined in step 51.

As shown in FIG. 4, a variation in the lift of the stabilizer 20 as obtained by moving the movable surfaces 21, 21' has the effect of modifying the angle of incidence of the main rotor 3 while the aircraft is in a stabilized stage of flight. Depending on this angle of incidence, the main rotor 3 may tend towards a nose-down position, as shown in FIG. 4, or a nose-up position, in terms of pitching moments, with the collective pitch and the cyclic pitch of the blades 31 of the main rotor 3 being modified in order to maintain the parameters of the stabilized stage of flight constant. Consequently, adjusting the lift of the stabilizer 20 leads to a modification in the longitudinal attitude of the aircraft 1. It is thus possible to adjust the lift of the stabilizer 20 so that the longitudinal cyclic pitch of the blades 31 of the main rotor 3 is equal to the setpoint longitudinal cyclic pitch.

In a variant of this step 54, the lift of the horizontal stabilizer 20 is adjusted so that the longitudinal bending moment of a mast of the main rotor 3 is equal to a setpoint longitudinal bending moment. It is possible to measure the bending moment of the mast of the main rotor 3, in particular in an aircraft 1 having a rigid hub. Thereafter, any modification to the lift of the stabilizer 20 modifies the angle of inclination of the main rotor 3 and consequently acts on the bending of the mast of the main rotor 3. As a result, by adjusting the lift of the stabilizer 20, it is possible to make the longitudinal bending moment of the mast of the main rotor 3 equal to a setpoint longitudinal bending moment so that the bending moment is small or even zero, thereby limiting the stresses on the mast.

Finally, a step 55 performed simultaneously with the steps 53 and 54 consists in displaying information on display means (shown in FIG. 5), this information 50 and 51 relating to the collective pitch and the cyclic pitch of the blades 31 of the main rotor 3, together with information 15, 16, 17, and 18 relating to the flaps 12, 12' of the two half-wings 11, 11' and information 25 and 26 relating to the horizontal stabilizer 20. This information 50 is constituted by a first graph showing a first point 56 corresponding to the current pair of values for the collective pitch and the longitudinal cyclic pitch of the blade 31 of the main rotor 3, and a second point 55 corresponding to the pair of values constituted by the setpoint collective pitch and the setpoint longitudinal cyclic pitch. The longitudinal cyclic pitch is plotted along the abscissa axis 53 and the collective pitch is plotted up the ordinate axis 52 of this first graph.

Figure 5:
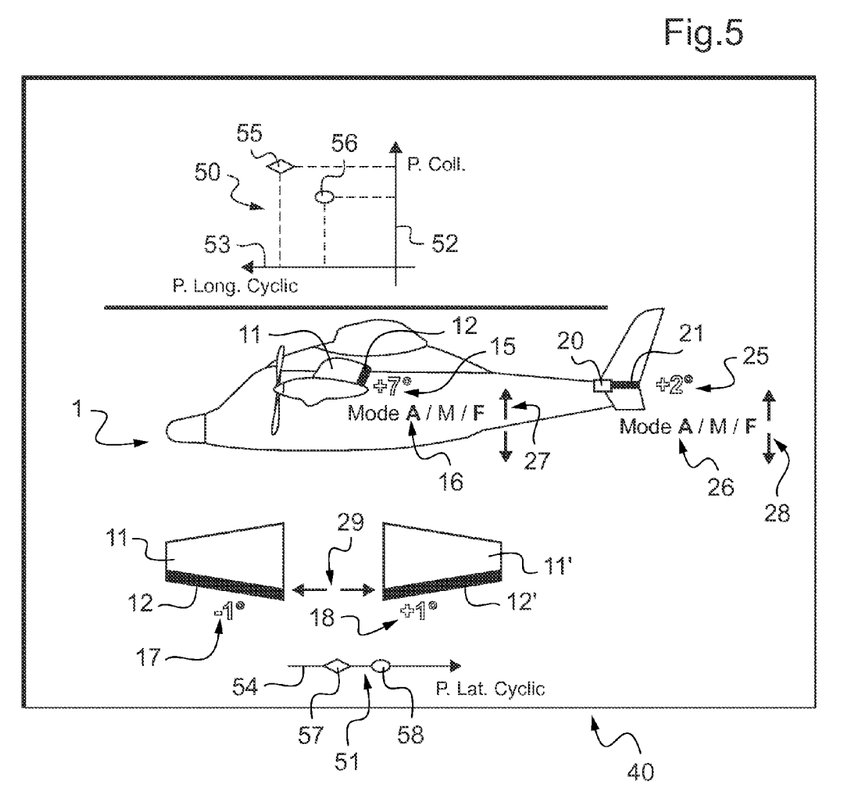
FIG. 5 shows display means of the aircraft.

In addition, the information 51 is constituted by a second graph having a single axis 54 representing the lateral cyclic pitch of the blades 31 of the main rotor 3. This second graph displays a third point 58 corresponding to the current value of the lateral cyclic pitch of the blades 31 of the main rotor 3 and a fourth point 57 corresponding to the setpoint lateral cyclic pitch.

The display means 40 also displays an operating mode 16 activated on the flaps 12, 12' and on the horizontal stabilizer 20. The control system that operates the flaps 12 and 12' may be controlled by an autopilot that is present on board the aircraft 1 or else manually by the pilot. This control system may also have failed and consequently not be in operation. Under such circumstances, the display means 40 displays information 16 concerning the flaps 12 and 12' in the form of a message "Mode A" when the autopilot is engaged, "Mode M" when the flaps 12 and 12' are manually controlled, and "Mode F" when the control system has failed. The same applies for the control means of the horizontal stabilizer 20.

Finally, the display means 40 displays deflection setpoints 27, 28, 29, e.g. in the form of arrows, for informing the pilot. These deflection setpoints 27, 28, 29 thus inform the pilot, when performing manual piloting, about the directions in which to move the flaps 12, 12' of each half-wing 11, 11' and the movable surfaces 21, 21' of the horizontal stabilizer 20 in order to cause the main rotor 3 to converge towards its optimum operating point.

This information thus enables the pilot to optimize the operation of the aircraft 1.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

For example, the adjustment of the lift of the two half-wings 11, 11' as performed in the implementation described by the aerodynamic control means constituted by the flaps 12, 12' and the control systems, could be obtained by a rotary movement of each half-wing 11, 11' as a whole, the half-wings 11, 11' then not including flaps 12, 12'. Such an adjustment may also be obtained with half-wings 11, 11' that do not have flaps 12, 12' and that are stationary relative to the fuselage 2 of the aircraft 1, and by changing the attitude of the aircraft 1.

Likewise, the adjustment of the lift of the horizontal stabilizer 20, performed in the implementations described by two movable surfaces 21 and 21' together with control means, could be performed by the horizontal stabilizer 20 being movable as a whole.

What is claimed is:

1. A method of controlling a high speed rotary wing aircraft, the aircraft comprising:
   a fuselage;
   at least one main rotor having a plurality of blades;
   at least one variable pitch propulsive propeller;
   at least two half-wings positioned on either side of the fuselage;
   at least one horizontal stabilizer positioned at one end of the aircraft, the horizontal stabilizer having at least one movable surface; and
   at least one power plant driving the main rotor and each propulsive propeller in rotation;
   the method comprising the following steps:
      determining a setpoint collective pitch and a setpoint longitudinal cyclic pitch for causing the aircraft to converge on an optimized operating point for the main rotor during a stabilized stage of flight, while conserving a constant vertical behavior target and a constant longitudinal attitude target corresponding to the stabilized stage of flight; and
      adjusting the lift of the half-wings by acting on aerodynamic control means of the aircraft so that the collective pitch of the blades of the main rotor is equal to the setpoint collective pitch.

2. The method according to claim 1, wherein the lift of the half-wings is adjusted when:
   the roll angle of the aircraft is less than 10°;
   the forward speed TAS of the aircraft is greater than 50 kts; and
   no action is detected on the controls of the aircraft.

3. The method according to claim 1, wherein the aerodynamic control means of the aircraft comprise at least one movable flap on each half-wing and at least one control system for moving the flaps, the method being characterized by the steps of determining the difference in lift between the half-wings that will compensate the effect of the main rotor on the half-wings, and of adjusting the lift of each of the half-wings by operating each of the flaps in different manners by acting on the control systems of the flaps in order to obtain the lift difference between the half-wings.

4. The method according to claim 1, wherein the aerodynamic control means of the aircraft comprise at least one movable flap on each half-wing and at least one control system for moving the flaps, the method being characterized by the step of adjusting the lift of each half-wing by operating the flaps in different manners by acting on the flap control means in order to cause the lateral cyclic pitch of the blades of the main rotor to be equal to a setpoint lateral cyclic pitch.

5. The method according to claim 1, wherein the lift of the horizontal stabilizer is adjusted by acting on control means for each of its movable surfaces so that the longitudinal cyclic pitch of the blades of the main rotor is equal to the setpoint longitudinal cyclic pitch while conserving a constant target longitudinal attitude of the aircraft corresponding to the stabilized stage of flight.

6. The method according to claim 1, in which each half-wing includes at least one movable flap, the method being characterized by the step of displaying information on display means of the aircraft, the information relating to the current values of the collective and cyclic pitches of the blades of the main rotor and the setpoint collective pitch and to the setpoint longitudinal and lateral cyclic pitches, together with information relating to the flaps and information relating to the horizontal stabilizer.

7. A high speed rotary wing aircraft comprising:
   a fuselage;
   at least one main rotor having a plurality of blades;
   at least one variable pitch propulsive propeller;
   at least one horizontal stabilizer positioned at one end of the aircraft, and including at least one movable surface together with at least one control means for moving the movable surface;
   at least two half-wings positioned on either side of the fuselage;
   at least one aerodynamic control means for modifying the lift of the two half-wings; and
   at least one power plant driving the main rotor and each propulsive propeller in rotation;
   wherein the aerodynamic control means serves to adjust the lift of the half-wings in such a manner that the collective pitch of the blades of the main rotor is equal to a setpoint collective pitch corresponding to an optimized operating point of the main rotor during a stabilized stage of flight.

8. The aircraft according to claim 7, wherein the control means for moving the movable surface serves to adjust the lift of the horizontal stabilizer so that the longitudinal cyclic pitch of the blades of the main rotor is equal to a setpoint longitudinal cyclic pitch corresponding to the optimized operating point of the main rotor during the stabilized stage of flight.

9. The aircraft according to claim 7, wherein the aerodynamic control means of the aircraft comprise at least one movable flap on each half-wing and at least one control system for moving the flaps, wherein the control system serves to move each flap in order to adjust the lift of the half-wings.

10. The aircraft according to claim 9, including display means displaying:
   information relating to the current values of the collective and cyclic pitches of the blades of the main rotor together with the setpoint collective pitch and the setpoint longitudinal and lateral cyclic pitches;
   information relating to the flaps;
   an activated mode of operation of the flaps;
   information relating to the horizontal stabilizer;
   an activated mode of operation of the horizontal stabilizer; and
   deflection setpoints for the flaps and for the horizontal stabilizer.

11. The method according to claim 1, where the constant vertical behavior comprises a constant vertical speed or a constant angle of incident.

12. The method according to claim 1, wherein the optimized operating point corresponds to a lift-to-drag ratio associated with minimum fuel consumption.

13. The aircraft according to claim 7, wherein the optimized operating point corresponds to a lift-to-drag ratio associated with minimum fuel consumption.

14. A method of controlling a high speed rotary wing aircraft, the aircraft comprising:
   a fuselage;
   at least one main rotor having a plurality of blades;
   at least one variable pitch propulsive propeller;
   at least two half-wings positioned on either side of the fuselage;
   at least one horizontal stabilizer positioned at one end of the aircraft, the horizontal stabilizer having at least one movable surface; and
   at least one power plant driving the main rotor and each propulsive propeller in rotation;

the method comprising the following steps:
- determining a setpoint collective pitch and a setpoint longitudinal cyclic pitch for causing the aircraft to converge on an optimized operating point for the main rotor during a stabilized stage of flight, while conserving a constant vertical behavior target and a constant longitudinal attitude target corresponding to the stabilized stage of flight; and
- adjusting the lift of the half-wings by acting on aerodynamic control means of the aircraft so that the collective pitch of the blades of the main rotor is equal to the setpoint collective pitch, wherein the aerodynamic control means of the aircraft comprise at least one movable flap on each half-wing and at least one control system for moving the flaps, the method being characterized by the step of adjusting the lift of each half-wing by operating the flaps in different manners by acting on the control systems for the flaps so that the lateral bending moment of a mast of the main rotor is equal to a setpoint lateral bending moment.

15. The method according to claim 14, wherein the lift of the half-wings is adjusted when:
- the roll angle of the aircraft is less than 10°;
- the forward speed TAS of the aircraft is greater than 50 kts; and
- no action is detected on the controls of the aircraft.

16. The method according to claim 14, the method being characterized by the steps of determining the difference in lift between the half-wings that will compensate the effect of the main rotor on the half-wings, and of adjusting the lift of each of the half-wings by operating each of the flaps in different manners by acting on the control systems of the flaps in order to obtain the lift difference between the half-wings.

17. The method according to claim 14, wherein the optimized operating point corresponds to a lift-to-drag ratio associated with minimum fuel consumption.

18. A method of controlling a high speed rotary wing aircraft, the aircraft comprising:
- a fuselage;
- at least one main rotor having a plurality of blades;
- at least one variable pitch propulsive propeller;
- at least two half-wings positioned on either side of the fuselage;
- at least one horizontal stabilizer positioned at one end of the aircraft, the horizontal stabilizer having at least one movable surface; and
- at least one power plant driving the main rotor and each propulsive propeller in rotation;

the method comprising the following steps:
- determining a setpoint collective pitch and a setpoint longitudinal cyclic pitch for causing the aircraft to converge on an optimized operating point for the main rotor during a stabilized stage of flight, while conserving a constant vertical behavior target and a constant longitudinal attitude target corresponding to the stabilized stage of flight; and
- adjusting the lift of the half-wings by acting on aerodynamic control means of the aircraft so that the collective pitch of the blades of the main rotor is equal to the setpoint collective pitch,
- the lift of the horizontal stabilizer being adjustable by acting on control means for each of its movable surfaces so that the longitudinal bending moment of a mast of the main rotor is equal to a setpoint longitudinal bending moment during the stabilized stage of flight.

19. The method according to claim 18, wherein the lift of the half-wings is adjusted when:
- the roll angle of the aircraft is less than 10°;
- the forward speed TAS of the aircraft is greater than 50 kts; and
- no action is detected on the controls of the aircraft.

20. The method according to claim 18, wherein the optimized operating point corresponds to a lift-to-drag ratio associated with minimum fuel consumption.

* * * * *